United States Patent [19]
Ishikawa

[11] Patent Number: 6,061,148
[45] Date of Patent: *May 9, 2000

[54] FACSIMILE RECEIVING APPARATUS

[75] Inventor: Yuji Ishikawa, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/842,879

[22] Filed: Apr. 17, 1997

Related U.S. Application Data

[62] Division of application No. 08/501,294, Jul. 12, 1995, abandoned.

[30] Foreign Application Priority Data

Jul. 15, 1994 [JP] Japan ..................................... 6-186551

[51] Int. Cl.$^7$ ............................... H04N 1/00; H04N 1/32; H04N 1/21
[52] U.S. Cl. ........................... 358/437; 358/437; 358/404; 358/468; 358/296
[58] Field of Search ...................................... 358/437, 404, 358/468, 296

[56] References Cited

U.S. PATENT DOCUMENTS

| 5,309,507 | 5/1994 | Hosaka et al. | 358/437 |
| 5,483,353 | 1/1996 | Kudou | 358/404 |

*Primary Examiner*—Edward L. Coles
*Assistant Examiner*—Twyler Lamb
*Attorney, Agent, or Firm*—Fitzpatrick, Cella, Harper & Scinto

[57] ABSTRACT

A facsimile apparatus prints out a received image interrupted during the reception by the same process for both the interruption of a communication line and the power failure of a power supply. A bit pattern called a page interruption code which does not appear in normal code data is used as data to be overwritten to erase the past image data stored in a buffer memory. In a decoding process, a function to detect an RTC code which is a normal page end code and a function to detect the page interruption code are provided so that the image interrupted during the reception is printed out to at least the last point of the received image.

26 Claims, 6 Drawing Sheets

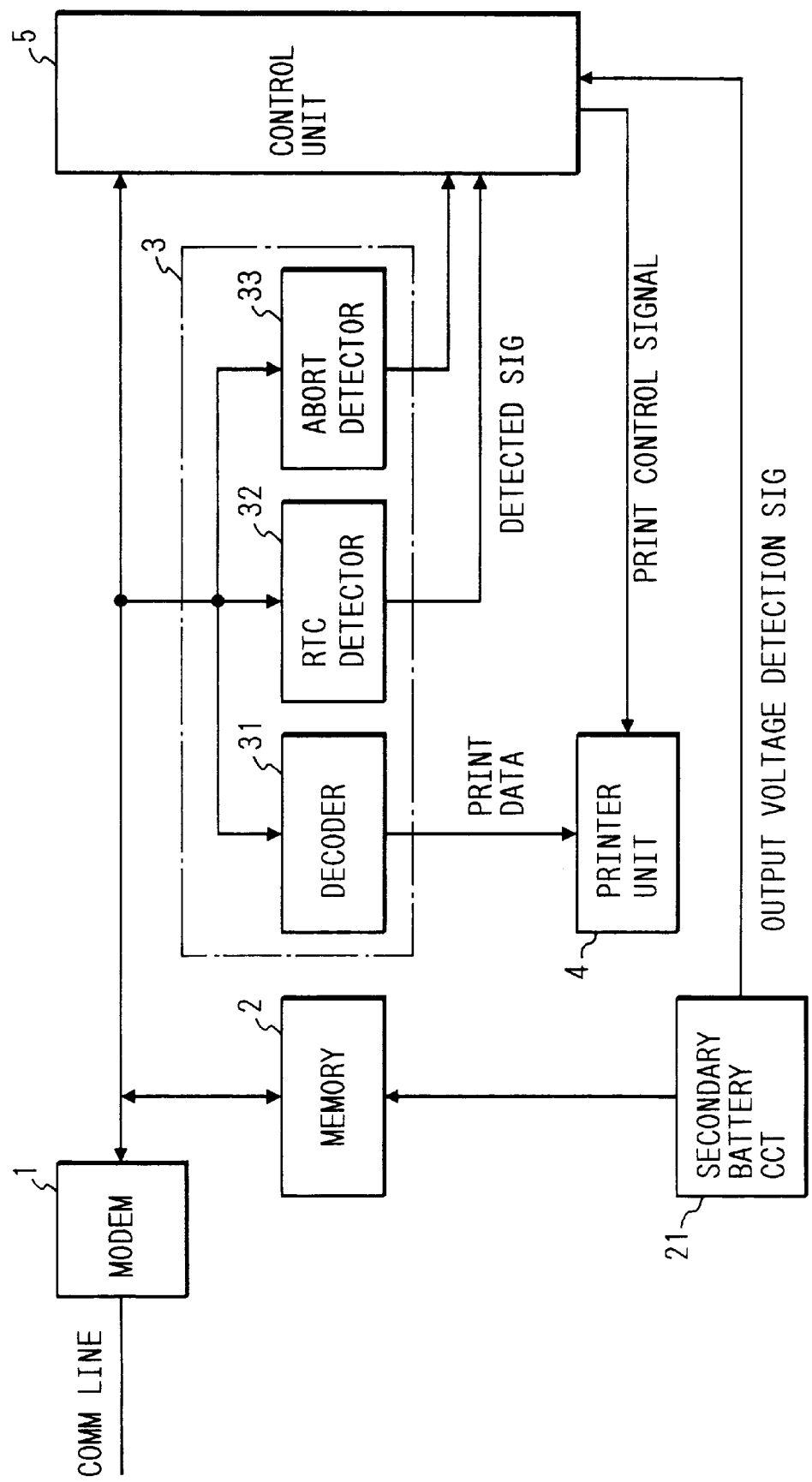

FIG. 2A

RTC | 0 0 0 0 0 0 0 1 | 0~01 | 0~01 | 0~01 | 0~01 | 0~01 | 0~01
     1 2 3 4 5 6 7 8 9 10 11

ABORT | 0 0 0 0 0 0 0 0 0 0 0 0 0 0 0 1 | 0~01 | 0~01 | 0~01 | 0~01 | 0~01 | 0~01
      1 2 3 4 5 6 7 8 9 10 11 12 13 14 15

```
ABORT ABORT ABORT ABORT ABORT ABORT ABORT ABORT ABORT ABORT ABORT ABORT ABORT ABORT ABORT ABORT
ABORT ABORT ABORT ABORT ABORT ABORT ABORT ABORT ABORT ABORT ABORT ABORT ABORT ABORT ABORT ABORT
```

FIG. 3B

```
**** **** CODED IMAGE DATA **** **********  | RTC | ABORT ABORT ABORT ABORT
```

FIG. 3C

```
**** **** CODED IMAGE DATA ****  ABORT ABORT ABORT ABORT ABORT ABORT ABORT ABORT ABORT
```

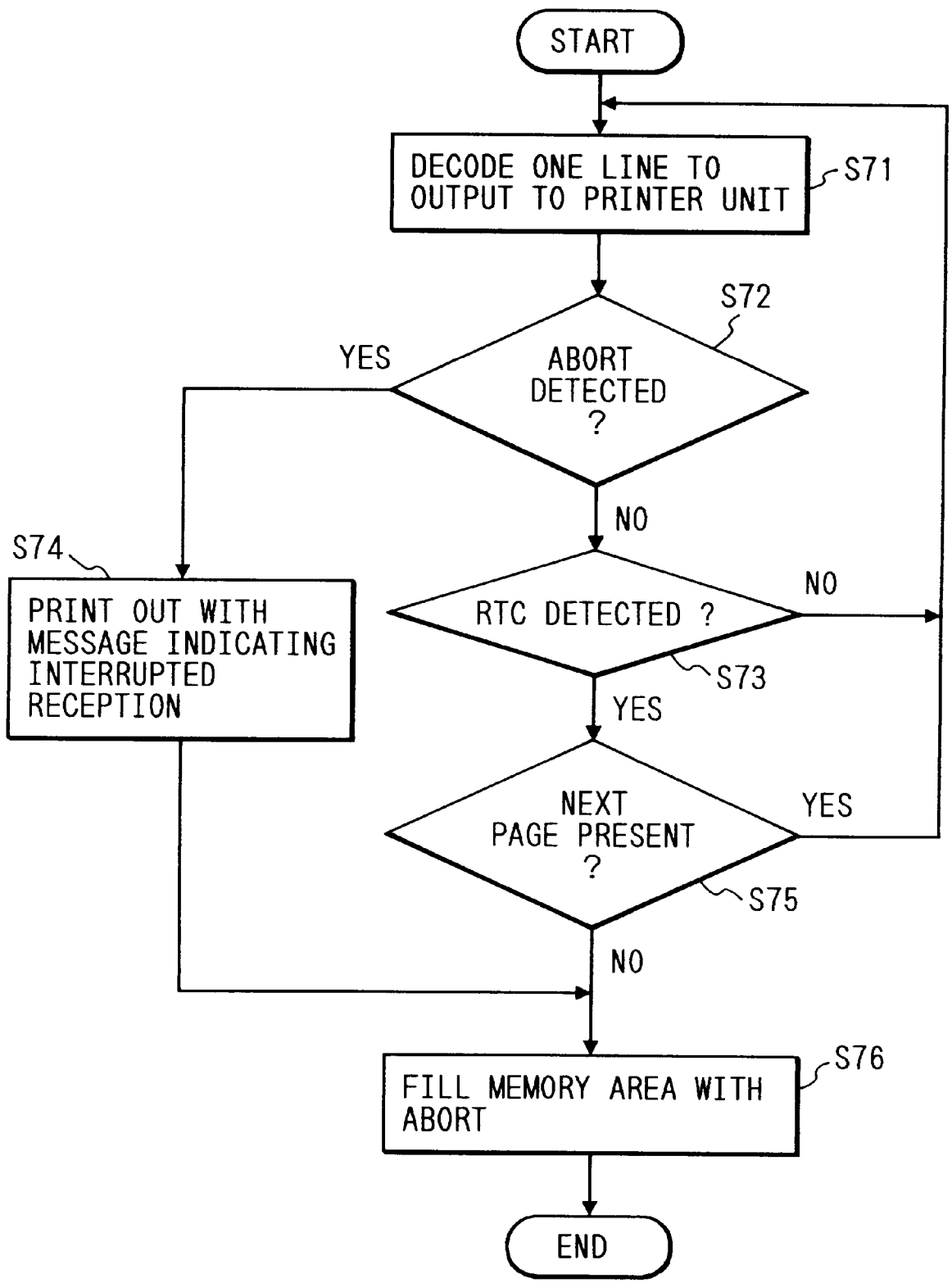

FACSIMILE RECEIVING APPARATUS

This application is a division, of application Ser. No. 08/501,294 filed Jul. 12, 1995, which is now abandoned.

BACKGROUND OF THE INVENTION

1. Field of the Invention

The present invention relates to the handling of an image under reception in a facsimile apparatus when abnormal interruption of a communication line or abnormal stop of a receiving apparatus occurs during the reception of the image.

2. Related Background Art

In a prior art facsimile apparatus using a rolled paper, an image is printed out serially in parallel with the reception of the image. Thus, even if the communication is interrupted, the image received immediately before the interruption can be printed out.

In a recent plain paper recording system, however, since a cut sheet is used, the received image is temporarily stored in a memory and the printing is started after one page of received image has been established.

In such an apparatus, when the abnormal interruption of the communication line occurs, the last stored address is stored in a buffer memory so that the received code up to that address is decoded and printed out.

Since there is a time lag between the receiving operation and the print operation, the memory is backed up by a battery in order to protect the data for sudden power failure.

However, when the buffer memory is used by the back-up, since the stop of the receiving apparatus by the power failure occurs suddenly, it is difficult to store up to which point of the image under reception has been stored in the buffer memory, unlike the operation at the interruption of the communication line described above.

If the decoding and the printing are made under this condition, an end point of the page may not be determined.

Further, in some cases, the control may be disturbed and the old stored data may be decoded and printed.

SUMMARY OF THE INVENTION

It is an object of the present invention to provide an improved facsimile apparatus.

It is another object of the present invention to provide a facsimile apparatus capable of printing out the received image interrupted during the reception by the same process for both the interruption of the communication line and the power failure of the power supply.

BRIEF DESCRIPTION OF THE DRAWINGS

FIG. 1 shows a block diagram of an embodiment of the present invention,

FIGS. 2A and 2B show examples of a page end code RTC and a page interruption code ABORT used in the embodiment, FIGS. 3A to 3C show data statuses stored in a buffer memory in the embodiment, FIG. 7 shows a flow chart for printing image data.

DETAILED DESCRIPTION OF THE PREFERRED EMBODIMENTS

Figure 4A:
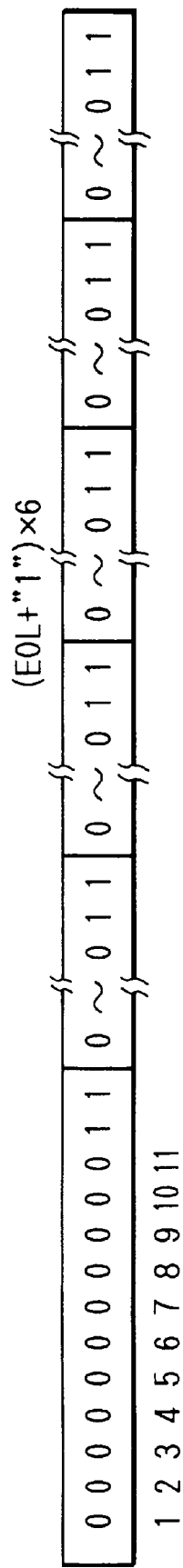
FIGS. 4A and 4B show another example of the page end code used in the embodiment.

FIG. 1 shows a block diagram of a configuration of a facsimile apparatus in accordance with one embodiment of the present invention.

In FIG. 1, a modem 1 modulates and demodulates data transmitted through a line to communicate data, and a buffer memory 2 stores coded image data received by the modem 1.

A decoder 3 decodes the encoded image signal stored in the buffer memory 2 into pixel data and comprises a pixel decoding unit 31 for decoding into pixel data, an RTC detection unit 32 for detecting a page end signal RTC from the coded image data and an ABORT detection unit 33 for detecting a page interruption code ABORT defined by the present invention.

A printer 4 prints out the received data (print data) decoded into the pixel data by the decoding unit 31, and a control unit 5 initializes a predetermined area of the buffer memory 2 for filling it with the ABORT code to initialize and discard the stored image data and also controls an operation of the apparatus.

A secondary battery circuit 21 supplies a back-up power to the buffer memory 2 during the stop (power failure) of a main power supply (not shown). During the stop of the main power supply, the memory content of the buffer memory 2 is held by the supply from the back-up power supply. Whether the back-up power is normally supplied during the stop of the main power supply is determined by detecting an output voltage of the secondary battery circuit when the main power supply is turned on (recovered).

FIG. 2A shows an example of the page end code RTC used in the present embodiment and FIG. 2B shows an example of the page interruption code ABORT.

The page end code RTC in the MH code in accordance with the ITU-T Recommendation is defined as a series of six units each comprising eleven 0's and one 1.

On the other hand, the ABORT code in the present embodiment is a series of six units each comprising fifteen 0's and one 1 while taking the easiness of use in a microcomputer into consideration.

FIGS. 3A to 3C illustrate statuses of data stored in the buffer memory 2. An operation of the present embodiment is now explained.

In an initial condition, the control unit 5 writes the ABORT code into the entire area of the buffer memory 2 (state shown in FIG. 3A).

Then, when the facsimile reception is started, the coded image data decoded and received by the modem 1 is serially stored in the buffer memory 2. In FIGS. 3B and 3C, the coded data is shown by a symbol *. When the received data is stored, the control unit 5 conduct 5 in parallel the decoding in order to obtain the reception state.

When the normal reception is completed, the RTC code is included at the end of the received data (state shown in FIG. 3B).

On the other hand, when the communication is interrupted or the power supply of the receiving apparatus fails during the reception operation, the image data under the reception which is not terminated with the RTC is stored in the buffer memory 2 (state of FIG. 3C).

When the received image is to be printed out, the control unit 5 first commands to the print unit 4 to start the printing. Then, the decoding unit 3 sequentially reads the coded data from the buffer memory and outputs the print pixel data to the printer 4 while it conducts the decoding operation.

In parallel therewith, the RTC detection unit 32 and the ABORT detection unit 33 of the decoding unit 3 respectively detect the codes to be detected.

When the normal reception is completed (state of FIG. 3B), the RTC detection unit 32 detects the page end signal RTC and informs the control unit 5 of it.

When the reception ends with the abnormal reception state (state shown in FIG. 3C), the ABORT detection unit 33 detects the page interruption code ABORT and informs it to the control unit 5 of it.

In this manner, both the normal reception image and the abnormal reception image terminate the printout. When the printout is completed, the control unit 5 fills the memory area used for storage with the ABORT code to reset the content of the buffer memory 2 to the state of FIG. 3A.

The ABORT code shown in the present embodiment is merely one example and it may be a bit pattern which does not normally appear in the code or an RTC code.

When the RTC code is used as the ABORT code, however, because a distinctive page interruption code is not used, it is not possible to recognize the image for which the reception was interrupted during the decoding for the printout nevertheless printing itself may still be conducted, because the end of the coded image data can now be determined with accuracy.

In the present embodiment, the RTC code detection unit and the ABORT code detection unit are independently provided. Alternatively, they may be implemented by one circuit by configuring the RTC detection unit to discriminate "1 following just eleven continuous 0's" and "1 following twelve or more continuous 0's".

Figure 4B:
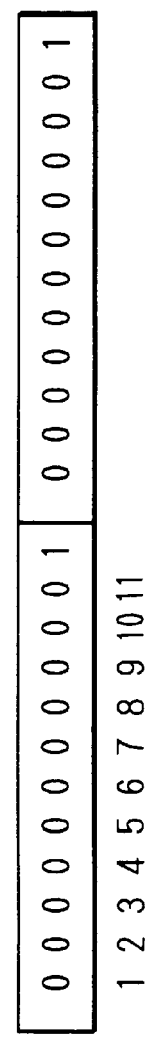

In the present embodiment, the MH code is explained. For the RTC code for the MR code and the RTC code for the MMR code, (the block end code EOFB) may be those shown in FIGS. 4A and 4B, respectively, as recommended by the ITU-T Recommendation.

As shown, for the MMR code, it is essentially same as that for the MH code except the number of times of repetition, but for the MR code, a tag bit representing a one-dimension code is added.

However, since the compressed code used for the image stored in the buffer memory is known at the time of reception, the same ABORT code may be used by switching the criterion of the RTC detection for each coding form.

In accordance with the present invention, the image interrupted during the reception after the sudden abnormal condition such as the interruption of the communication line or the power failure may be printed out to at least the received end with the simple construction of filling the ABORT code in the vacant area of the buffer memory.

Figure 5:
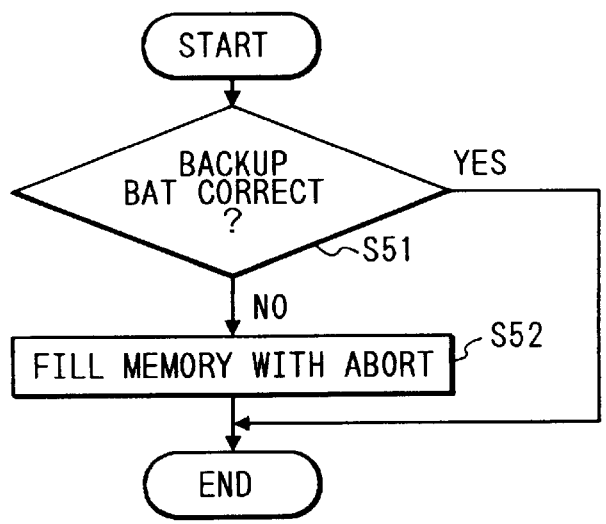
FIG. 5 shows a flow chart of an initialization routine of the buffer memory.

FIG. 5 shows a flow chart of an initialization routine of the buffer memory 2 when the main power supply of the apparatus is turned on. When the main power supply stops (power failure), the back-up power is supplied to the buffer memory 2 from the rechargeable secondary battery circuit 21 so that the content of the buffer memory is held during the power failure.

S51:

Whether the back-up power is normally supplied during the stop of the main power supply and the content of the buffer memory 2 is held is determined.

This is determined by checking whether the output terminal voltage of the secondary battery circuit is equal to or above a predetermined voltage or not.

If the back-up function is normal, the data in the buffer memory 2 is not initialized and the routine is terminated.

On the other hand, if the back-up function is not valid, it means that the data in the buffer memory is uncertain (there is no insurance that the content of the memory is correct) and the process proceeds to S52.

S52:

The entire area of the buffer memory 2 is filled with the ABORT code.

Figure 6:
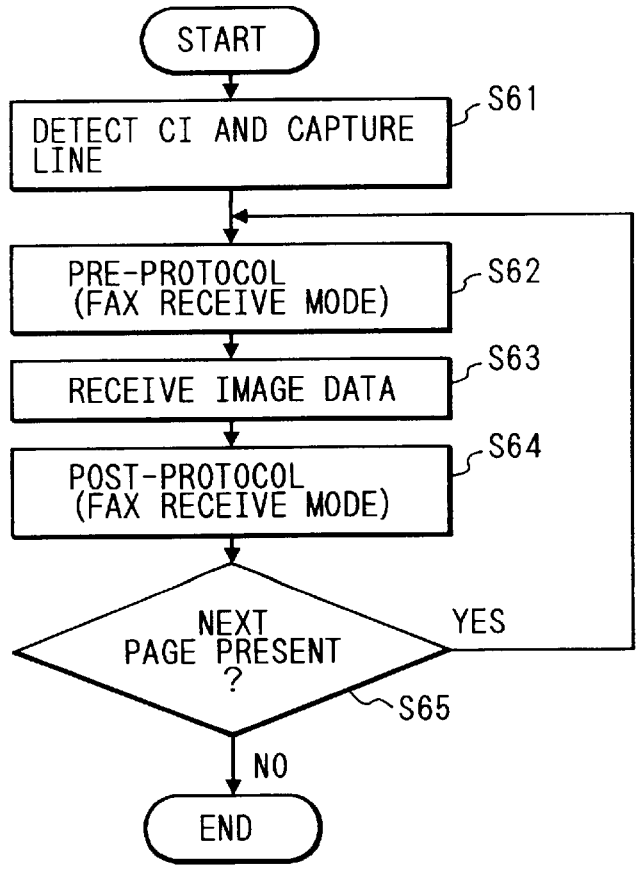
FIG. 6 shows a flow chart of a receiving operation.

FIG. 6 shows a flow chart of the receiving operation of the apparatus. The receiving operation of the present invention is not different from the receiving operation of a conventional facsimile apparatus.

S61:

When a call signal (CI) from the communication line is detected, the line is captured and the apparatus is connected to the line.

S62:

A pre-reception protocol is conducted in accordance with the facsimile protocol and negotiation is conducted for the image communication.

S63:

The coded image data is received and serially stored in the buffer memory 2 and the decoding to check the quality of reception is conducted parallelly.

S64:

A post-protocol is conducted in accordance with the facsimile protocol.

S65:

If the transmission of the next page from the sending terminal is indicated in S64, the process returns to S62. If no more next page, the communication is terminated and the line is released.

FIG. 7 shows a flow chart when the coded image data stored in the buffer memory 2 is printed. The present flow chart is executed for each printout of one received image. When a plurality of received image data are included in the buffer memory 2, the flow chart is executed for each printout thereof.

S71:

The coded image data stored in the buffer memory 2 is decoded until one line of data is decoded or the ABORT code is detected and the decoded image data is outputted to the printing unit 4.

S72:

Whether the ABORT code has been detected or not is determined.

If it is detected, the process proceeds to S74, otherwise the process proceeds to S73.

S73:

Whether the RTC code which is the page end code has been detected or not is determined.

If it is detected, the process proceeds to S75, otherwise the process returns to S71 to reconduct the decoding of the next line and the printout.

S74:

Since the printed image data is not terminated with the RTC code but terminated with the ABORT code, it is determined that the reception of the image data has been interrupted by any obstacle such as the interruption of the line or the stop of the main power supply of the apparatus, and any message image representing the interruption of reception is printed following to the printed image data.

S75:

Whether there is another image to be continuously printed or not is determined. If it is present, the process returns to S71 to reconduct the printout, otherwise the process proceeds to S76.

S76:

The ABORT code is written into the area of the buffer memory 2 in which the printed image data has been stored to erase the printed image data and make ready to the detection of the interruption of the reception when the next received image data is stored.

What is claimed is:

1. A communication apparatus, comprising:
   reception means for receiving a page of data through a communication line;
   a memory for storing data received by said reception means;
   initializing means for filling an entire area of said memory with a plurality of predetermined code patterns;
   detecting means for detecting one of the predetermined code patterns;
   output means for outputting the received data stored in said memory; and
   control means for terminating the outputting of the received data by said output means in accordance with a detection of the one predetermined code pattern by said detection means,
   wherein said reception means overwrites said memory filled with said plurality of predetermined code patterns with the received data.

2. An apparatus according to claim 1, wherein the data comprises image data.

3. An apparatus according to claim 1, wherein the predetermined codes comprise codes indicating a page interruption.

4. An apparatus according to claim 1, wherein the predetermined codes comprise codes indicating a page end.

5. An apparatus according to claim 1, wherein the data includes a page end code, and said reception means also overwrites said memory with the page end code of the data.

6. An apparatus according to claim 1, wherein said output means comprises a printer.

7. An apparatus according to claim 1, wherein said control means causes said initializing means to overwrite said memory with the predetermined codes when said memory is initialized or when the data stored in said memory is discarded.

8. An apparatus according to claim 1, wherein the data comprises coded data.

9. A communication method for a communication apparatus, said method comprising the steps of:
   receiving a page of data through a communication line electrically connected to the communication apparatus;
   filling an entire area of a memory of the communication apparatus with a plurality of predetermined code patterns;
   detecting one of the predetermined code patterns;
   outputting the received data stored in the memory; and
   terminating the outputting of the received data in said output step in accordance with the detection of the one predetermined code pattern in said detection step,
   wherein said receiving step overwrites the memory filled with the plurality of predetermined code patterns with the received data.

10. A method according to claim 9, wherein the data comprises image data.

11. A method according to claim 9, wherein the predetermined codes comprise codes indicating a page interruption.

12. A method according to claim 9, wherein the predetermined codes comprise codes indicating a page end.

13. A method according to claim 9, wherein the data includes a page end code, and in said receiving step the memory is also overwritten with the page end code of the data.

14. A method according to claim 9, wherein said outputting step is performed by a printer.

15. A method according to claim 9, wherein said initializing step overwrites the memory with the predetermined codes when the memory is initialized or when the data stored in the memory is discarded.

16. A method according to claim 9, wherein the data comprises coded data.

17. A data receiving apparatus, comprising:
   reception means for receiving data;
   non-volatile memory means for storing data received through said reception means;
   output means for outputting the data received by said reception means and stored in said memory means; and
   eraser means for entirely overwriting the data stored in said memory means with predetermined code patterns to erase the data,
   wherein the predetermined code patterns are overwritten with the data received through said reception means to store the received data in said memory means, and when a power failure occurs during reception of the data by said reception means, said memory means retains the data having been received, and after the power failure is removed, said output means outputs the data as retained during the power failure without outputting the code patterns.

18. An apparatus according to claim 17, further comprising detection means for detecting the predetermined codes, wherein said output means suspends outputting of the data in accordance with detection of the predetermined codes by said detection means.

19. An apparatus according to claim 17, wherein the data comprises image data.

20. An apparatus according to claim 17, wherein the predetermined codes comprise codes indicating a failure.

21. An apparatus according to claim 17, wherein the predetermined codes comprise codes indicating a page end.

22. A method for controlling a data receiving apparatus comprising the steps of:
   receiving data;
   storing data received in said receiving step in a non-volatile memory;
   outputting the data received in said receiving step and stored in said storing step; and
   entirely overwriting the data stored in said storing step with predetermined code patterns to erase the data,
   wherein the predetermined code patterns are overwritten with the data received in said receiving step to store the received data in the non-volatile memory, and when a power failure occurs during reception of the data in said receiving step, the non-volatile memory retains the data having been received, and after the power failure is removed, outputs the data as retained during the power failure without outputting the code patterns.

23. A method according to claim 20, further comprising the step of detecting the predetermined codes, wherein said outputting step suspends outputting of the data in accordance with detection of the predetermined codes detected in said detecting step.

24. A method according to claim 20, wherein the data comprises image data.

25. A method according to claim 20, wherein the predetermined codes comprise codes indicating a failure.

26. A method according to claim 20, wherein the predetermined codes comprise codes indicating a page end.

* * * * *

UNITED STATES PATENT AND TRADEMARK OFFICE
CERTIFICATE OF CORRECTION

PATENT NO. : 6,061,148

DATED : May 9, 2000

INVENTOR(S) : YUJI ISHIKAWA

It is certified that error appears in the above-identified patent and that said Letters Patent is hereby corrected as shown below:

COLUMN 1

Line 30, "for" should read --from--

COLUMN 2

Line 54, "conduct 5" should read --conducts--

COLUMN 3

Line 11, "it to" should be deleted

Line 24, "printout never-" should read

--printout. Never- --

COLUMN 4

Line 24, "parallelly." should read --in parallel.--

Line 58, "that" should read --whether--

UNITED STATES PATENT AND TRADEMARK OFFICE
CERTIFICATE OF CORRECTION

PATENT NO. : 6,061,148

DATED : May 9, 2000

INVENTOR(S) : YUJI ISHIKAWA

Page 2 of 2

It is certified that error appears in the above-identified patent and that said Letters Patent is hereby corrected as shown below:

COLUMN 5

Line 4, "to" should read --for--

COLUMN 7

Line 1, "claim 20," should read --claim 22,--

Line 6, "claim 20," should read --claim 22,--

COLUMN 8

Line 1, "claim 20," should read --claim 22,--

Line 3, "claim 20," should read --claim 22,--

Signed and Sealed this

Tenth Day of April, 2001

Attest:

NICHOLAS P. GODICI

*Attesting Officer*    *Acting Director of the United States Patent and Trademark Office*